United States Patent Office 3,361,749
Patented Jan. 2, 1968

3,361,749
CERTAIN N-PYRIMIDYL ANTHRANILIC
ACID DERIVATIVES
Max Matter and Fritz Rudolf Staehelin, Muri, near Bern,
Switzerland, assignors to HACO A.G., Bern, Switzerland, a Swiss corporation
No Drawing. Filed Dec. 13, 1965, Ser. No. 513,597
Claims priority, application Switzerland, Dec. 15, 1964,
16,161/64
5 Claims. (Cl. 260—256.4)

ABSTRACT OF THE DISCLOSURE

Compounds of the fromula

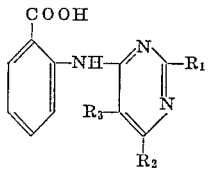

and pharmaceutically acceptable salts thereof with bases, wherein $R_1$ is H, Cl, lower alkyl, phenyl, phenyl(lower)-alkyl, lower alkoxy, lower alkylamino, lower dialkylamino or phenylamino, $R_2$ is H, Cl or lower alkoxy, and $R_3$ is H, Cl or nitro, are suitable, because of their analgetic-antiphlogistic action, for combatting diseases accompanied by inflammatory processes, such as rheumatic conditions and thrombophlebitis. The preparation of such compounds is also disclosed.

---

The present invention concerns new N-pyrimidyl anthranilic acid derivatives of the general Formula I

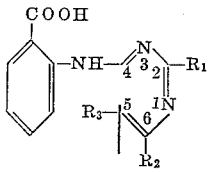

wherein $R_1$ represents hydrogen, a halogen atom, a low alkyl radical, a phenyl radical, a phenalkyl radical, a low alkoxy radical, a low alkylamino radical, a low dialkylamino, or a phenyl amino radical, $R_2$ represents hydrogen, a halogen atom or a low alkoxy radical, and $R_3$ represents hydrogen, a halogen atom or the nitro group. In addition, the present invention also concerns the pharmaceutically acceptable salts thereof as to the carboxylic group.

Of particular importance is the surprising observation that the new anthranilic acid derivatives possess valuable pharmacological properties and can thus be used in human and veterinary medicine. In particular, they have a very good analgetic-antiphlogistic action and are thus very suitable for combatting diseases accompanied by inflammatory processes such as rheumatic conditions and thrombophlebitis.

Another subject of the present invention is the production of the new anthranilic acid derivatives of Formula I by condensing in a conventional manner anthranilic acid or a salt thereof with a pyrimidine derivative of the general Formula II

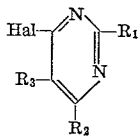

wherein Hal represents a halogen atom and, optionally, if in the compound so obtained $R_1$ and/or $R_2$ mean a halogen atom, converting $R_1$ and/or $R_2$ into a hydrogen atom and/or a low alkoxy radical, or $R_1$ respectively into a low alkylamino, a low dialkylamino or a phenylamino radical, and further optionally converting a resulting free acid into a salt or a resulting salt into a free acid.

When condensing anthranilic acid with a compound of the general Formula II, the following procedure can be adopted:

1 mol of an alkali salt of anthranilic acid such as, for example, the sodium or potassium salt, is reacted with 1 mol of a pyrimidine substituted in the 4-position by a halogen atom such as, for example, chlorine or bromine. The reaction is performed in water or in a mixture of water and an organic solvent miscible therewith at temperatures between 0–150°, mostly below 100°—below room temperature when particularly active 4-halogen pyrimidines are used. Suitable solvents are, for example, alcohols such as methanol, ethanol or methyl Cellosolve.

The anthranilic acid derivatives of the general Formula I obtained by means of the described condensation can then, optionally, be converted into other N-pyrimidinyl anthranilic acids of Formula I claimed by the present invention. This is done by modifying further halogen atoms in the 2- and/or 6-position of the pyrimidine ring into other groups according to the definitions of $R_1$ and $R_2$ in the general Formula I.

It is known from the literature that, on replacing the halogen atoms in 2,4-dihalogeno pyrimidines, generally the halogen atom in the 2-position is exchanged first. This is also the case for the new N-(2,6-dihalogeno-4-pyrimidinyl)-anthranilic acids. Thus, for example, in the N-(2,6-dihalogeno-4-pyrimidinyl)-anthranilic acids of general Formula III

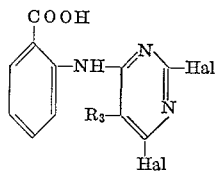

wherein Hal is a halogen atom, with a suitable choice of reaction conditions, first the halogen atom in the 2-position can be replaced by the known method, whereby also the N-(6-halogeno-4-pyrimidinyl)-anthranilic acids of the general Formula IV

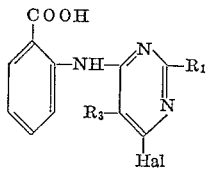

can be obtained in good to excellent yield. In the compounds of general Formula IV obtained in this way the halogen atom in the 6-position can also, optionally, be converted into other radicals as defined for $R_2$ in Formula I. If $R_1$ and $R_2$ represent identical radicals then, in the compounds of Formula III, both halogen atoms can be converted in one step into the corresponding radicals.

Generally, the halogen atom in the 5-position of the pyrimidine nucleus of the new compounds of general Formula I cannot be replaced so that the radicals in the 5-position must already be present in the pyrimidines of general Formula II before the condensation with anthranilic acid.

The primary substances used for the production of N-pyrimidinyl anthranilic acids according to the invention are known or can be produced by known methods.

Depending on the way in which the process is performed, the new compounds according to the invention are obtained in the form of the free acids or their salts.

The free acids can be obtained in the usual way from the salts of the new N-pyrimidinyl anthranilic acids; on the other hand, the free N-pyrimidinyl anthranilic acids can be converted into their salts by known methods. For the formation of therapeutically acceptable salts, inorganic bases are suitable such as sodium hydroxide, sodium carbonate, ammonia, potassium hydroxide, calcium hydroxide, or organic bases such as diethylamine, diethanolamine, diethylamino, ethanol, ethylenediamine, or therapeutically actvie bases such as tetraethyl ammonium hydroxide.

The new compounds can be used as medicaments, for example in the form of pharmaceutical preparations, these preparations containing the N-pyrimidinyl anthranilic acids which can be prepared according to the invention or their salts in admixture with a pharmaceutical, organic or inorganic carrier suitable for enteral, parenteral or topical administration. Examples of carriers are water, gelatine, lactose, starch, magnesium stearate, talcum, vegetable oils, benzyl alcohols, rubber, polyalkylene glycols, vaseline, cholesterol or other known pharmaceutical carriers. The pharmaceutical preparations can be, for example, in the form of tablets, dragées (sugar coated tablets), ointments, creams, or in liquid forms as solutions, suspensions or emulsions. They can be sterilised and/or contain auxiliaries such as conserving, stabilising, wetting or emulsifying agents, salts for altering the osmotic pressure, or buffers. They can also contain additional therapeutically valuable substances such as local anaesthetics. Such pharmaceutical preparations are produced by the usual methods.

The invention is described in the following examples which are non-limitative in character; the temperatures are given in degrees centigrade.

Example 1

13.7 g. of anthranilic acid are dissolved with 100 ml. of N-sodium hydroxide solution at room temperature as the sodium salt. 14.9 g. of 4,6-dichloropyrimidine are added to the clear solution and the mixture is slowly heated in an oil bath to 85–90° while stirring well. In a very short time after the dichloro-pyrimidine has melted, the N-(6-chloro-4-pyrimidinyl)-anthranilic acid formed begins to precipitate in crystalline form. The condensation is completed by stirring for about another two hours at the above temperature. While still hot, any excess alkali is buffered to pH 5–6 with a little dilute acetic acid. After cooling, the reaction product which has precipitated in a very pure form, is filtered off under suction, washed with 2% acetic acid and water and, finally, washed with methanol. M.P. 220° (decomposition). To further purify, the susbtances can be dissolved in N-sodium hydroxide solution, the aqueous, weakly alkaline solution treated with active charcoal and, if necessary, washed with ether. Naturally, this treatment can also be performed directly with the reaction mixture if, after completion of the condensation, it is dissolved by the addition of sodium hydroxide solution. The N-(6-chloro-4-pyrimidinyl)-anthranilic acid obtained is finally precipitated by the addition of dilute acetic acid—possibly after dilution with a lttle methanol—and is washed as described above.

The following substances can be obtained in an analogous manner:

| Example | Name | M.P., °C. |
|---|---|---|
| 2 | N-(2-methyl-6-chloro-4-pyrimidinyl)-anthranilic acid. | [1] 229 |
| 3 | N-(2-propyl-6-chloro-4-pyrimidinyl)-anthranilic acid. | [1] 195 |
| 4 | N-(2-benzyl-6-chloro-4-pyrimidinyl)-anthranilic acid. | [1] 212 |

[1] Decomposition.

The 2-benzyl-4,6-dichloropyrimidine (M.P. 60°) used as starting material in Example 4 was produced by condensing 13.4 g. of phenylaceto-amidine-acetate and 24 g. of malonic acid diethyl ester in the presence of a solution of 7.35 g. of sodium dissolved in 100 ml. of absolute methanol, by refluxing for 5 hours and heating the resulting 2-benzyl-4,6-dihydroxypyrimidine (M.P. 300°, with decomposition) under reflux with 59 g. of phosphorus oxychloride and 11.7 g. of dimethylaniline.

Example 5

A solution of 70 g. of anthranilic acid in 2 N sodium hydroxide solution, the pH of which has been adjusted to 7–8, is added dropwise within 30–40 minutes to a solution of 92 g. of 2,4,6-trichloropyrimidine in 200 ml. of methyl Cellosolve. The addition is made at 25–30° while stirring, whereby slight cooling must be applied. The reaction solution is then heated in an oil bath with continuous stirring. Already on heating, after about 40° has been attained, it is recommended to induce by seeding the precipitation of the condensation product so that it will be obtained in a form which can easily be filtered off. After stirring for 1 hour at 60°, it is allowed to cool and, to complete the precipitation, 500 ml. of water acidified with 10 ml. of acetic acid are added, whereupon after several hours the product is filtered off under suction at about 10°, washed with dilute methanol and then dried. The N-(2,6-dichloro-4-pyrimidinyl)-anthranilic acid is obtained in the form of a beige coloured powder. To all intents and purposes it is pure; it sinters with decomposition at about 173°.

Example 6

A solution of 2.35 g. of sodium in 60 ml. of abs. methanol is added dropwise within 45 minutes to a well stirred mixture of 14.2 g. of finely pulverised N-(2,6-dichloro-4-pyrimidinyl)-anthranilic acid (Example 5) and 50 ml. of abs. methanol at 25–30°. While continuously stirring it is slowly brought to the boil and refluxed for 5 hours. After cooling, it is diluted with 200 ml. of water and the slightly cloudy, neutral reaction solution is clarified with active charcoal. The condensation product is then precipitated by stirring in 25 ml. of 2 N hydrochloric acid 13.5 g. of N-(2-methoxy-6-chloro-4-pyrimidinyl)-anthranilic acid are obtained by filtering off, washing with water and a little methanol. The substance decomposes at about 175°. If necessary, it can be recrystallised from methanol.

Example 7

A solution of 0.95 g. of sodium in 30 ml. of abs. butanol is added within about 15 minutes to a 25–30° warm mixture of 5.7 g. of N-(2,6-dichloro-4-pyrimidinyl)-anthranilic acid (Example 5) and 20 ml. of abs. butanol. The starting material, the greater part of which is suspended at the beginning, gradually dissolves. After stirring for another 2½ hours at 75°, it is diluted with 100 ml. of water and the resulting N-(2-n-butoxy-6-chloro-4-pyrimidinyl)-anthranilic acid is precipitated by the addition of 10 ml. of 50% acetic acid. After stirring for a considerable time at about 10° it is filtered off under suction and the condensation product, which is obtained in a good yield, is washed with water and a little methanol. The compound can be purified by dissolving and reprecipitating as described in Example 1 and can be recrystallised from benzene when it is obtained as a fine crystalline powder which melts at 178°.

Example 8

11.4 g. of N-(2,6-dichloro-4-pyrimidinyl)-anthranilic acid (Example 5) are suspended in 80 ml. of abs. ethanol, 7.9 g. of a 33% solution of methylamine in ethanol are added and the whole is heated for 8 hours at 100° in an autoclave while stirring. After cooling to 30°, the yellowish reaction slurry is filtered off under suction and washed with methanol, water and methanol. After drying, the N-(2-methylamino-6-chloro-4-pyrimidinyl)-anthranilic acid is obtained as a pale beige, microcrystalline powder. The substance melts at about 225° with decomposition. If necessary, it can be further purified as follows: dissolving in 60 ml. of methanol with the addition of N sodium hydroxide solution until the pH is 10 at 40° and clarifying this solution with active charcoal. To re-precipitate, 50% acetic acid is carefully added at 50–60° until the pH is 5. After cooling for a considerable time, the acid is filtered off under suction at 10° and again washed with methanol, water and methanol.

*Example 9*

14.2 g. of N-(2,6-dichloro-4-pyrimidinyl)-anthranilic acid (Example 5) and a solution of 7.6 g. of n-butylamine in 150 ml. of abs. ethanol are heated in an autoclave for 15 hours at 110° while stirring. After cooling, it is diluted with 300 ml. of water, the pH is adjusted to 10 with 2 N sodium hydroxide solution and the solution is filtered, with active charcoal, through Celite. After heating to 60°, the pH is adjusted to 5 with glacial acetic acid and then, after stirring well, the N-(2-n-butylamino-6-chloro-4-pyrimidinyl)-anthranilic acid which has precipitated in a finely crystalline form is filtered off under suction at this temperature and washed with alcohol, water and methanol. The substance dissolves with difficulty in all usual solvents and, if necessary, is purified best by dissolving and precipitating as described in Example 8. M.P. about 214° (decomposition).

*Example 10*

5.8 g. of 4,6-dichloro-5-nitropyrimidine are dissolved in 30 ml. of methyl Cellosolve at 30°. After cooling to 0° while stirring, the greater part has again separated out in very good crystalline form. A solution of 4.1 g. of anthranilic acid in about 15 ml. of 2N sodium hydroxide solution (pH 8) is then added dropwise to this suspension at 0–5°, the addition being made within 35 minutes, and the whole is stirred for 5 hours at 0°. The temperature is then allowed to rise to room temperature and the N-(5-nitro-6-chloro-4-pyrimidinyl)-anthranilic acid obtained is precipitated by stirring in dilute acetic acid (30 ml. of water and 2 ml. of glacial acetic acid). After a short stirring the product can be filtered off under suction and washed with water and with methanol. The compound melts at about 180° with decomposition. It can be purified, if necessary, by recrystallisation from 30 parts of glacial acetic acid. To attain more complete precipitation, the clear filtered solution is diluted while still warm with about 20% water. The substance is then obtained in the form of small yellow, glass-clear crystals.

*Example 11*

3.7 g. of 4,5,6-trichloropyrimidine are added at room temperature to a solution of 2.75 g. of anthranilic acid in about 40 ml. of 0.5 N sodium hydroxide solution (pH 7) and the mixture is heated for 5 hours while stirring at 65°. It is diluted with 50 ml. of water and the pH is adjusted to 4 by the addition of 1 ml. of glacial acetic acid. The crude product is then filtered off under suction and thoroughly washed with water and with methanol. To further purify, it is dissolved in 100 ml. of water and 15 ml. of 2 N sodium hydroxide solution, the solution is extracted with ether, clarified with active charcoal and the substance is precipitated with dilute acetic acid at pH 4. 4.6 g. of N(-5,6-dichloro-4-pyrimidinyl)-anthranilic acid are obtained. The substance is colourless powder. After a prior conversion into longish prisms, it melts at 240° with decomposition.

*Example 12*

50 ml. of ethanol are poured over 5.7 g. of N-(2,6-dichloro-4-pyrimidinyl)-anthranilic acid (Example 5) and 5.7 g. of 33% ethanolic dimethylamine are added. The mixture is heated in an autoclave for 8 hours at 100° while stirring. After cooling, the reaction mixture is stirred with 100 ml. of water to which has been added 5 ml. of glacial acetic acid. After homogenising the precipitate well, it is filtered off under suction, washed with a good quantity of water and finally with a little methanol and dried. The crude product is then purified, e.g., as described in Example 8 by dissolving with sodium hydroxide solution in methanol and again precipitating with acetic acid, whereupon the desired N-(2-dimethylamino-6-chloro-4-primidinyl)-anthranilic acid is obtained in the form of thread-like crystals which melt at 212° with decomposition. The compound can be recrystallized from ethyl acetate or alcohol.

*Example 13*

N-(2-diethylamino-6-chloro-4-pyrimidinyl) - anthranilic acid (M.P. 192°, sight decomposition) is obtained in a manner completely analogous to that described in the previous Example 12 from 5.7 g. of N-(2,6-dichloro-4-pyrimidinyl)-anthranilic acid (Example 5) and 3.1 g. of diethylamine in 50 ml. of ethanol.

*Example 14*

5.0 g. of N - (6 - chloro - 4 - pyrimidinyl) - anthranilic acid (Example 1) are added at room temperature to a solution of 0.95 g. of sodium in 40 ml. of n-butanol. The mixture is slowly brought to the boil while stirring and then kept boiling for 7 hours. It is then diluted with 200 ml. of water, acidified with 25 ml. of 2 N hydrochloric acid, the resulting N-(6-n-boutoxy-4-pyrimidinyl)-anthranilic acid is filtered off under suction and washed with water and with a little methanol. The almost quantitative yield of crude product obtained in this way is already very pure. Ethyl acetate is very suitable for recrystallisation; the compound is obtained in microscopic, colourless small needles which melt at 169° (with slight decomposition).

*Example 15*

A solution of 4.8 g. of N-(2-n-butylamino-6-chloro-4-pyrimidinyl)-anthranilic acid (Example 9) in 16 ml. of 2 N sodium hydroxide solution and 25 ml. of ethanol is hydrogenated at room temperature using 0.85 g. of Pt. charcoal (5%) and 0.85 g. of Pd. charcoal (5%). After the theoretical amount of hydrogen has been taken up, which is the case after about 30 minutes, the catalyst is filtered off and the filtrate is washed with alcohol containing a trace of sodium hydroxide solution. The N-(2-n-butylamino-4-pyrimidinyl)-anthranilic acid is then precipitated by acidifying with dilute acetic acid to pH 4. The compound is extremely difficultly soluble in the usual solvents. To further purify, for example, it is dissolved in 25 ml. of ethanol and 15 ml. of 2 N sodium hydroxide solution and the solution is clarified with charcoal through Celite. 50 ml. of dimethyl formamide are then added to the clear, pale filtrate and the compound is again precipitated by stirring in 5 ml. of glacial acetic acid dissolved in 30 ml. of dimethyl formamide at about 40°. It is filtered off under suction and thoroughly washed with methanol. In the melting test the fine granular crystals change at above about 240°, with sublimation, into glassy platelets which melt at 287° with decomposition.

*Example 16*

2.84 g. of N-(2,6-dichloro-4-pyrimidinyl)-anthranilic acid (Example 5) and a solution of 0.7 g. of sodium in 40 ml. of methanol are heated in an autoclave made of glass at 100° for 6 hours while stirring. 200 ml. of water are added to the solution obtained, the pH of which is about 6, the excess methanol is liberated in vacuo whereupon, after clarifying the solution with active charcoal, the desired N-(2,6-dimethoxy-4-pyrimidinyl)-anthranilic acid is precipitated by adding acetic acid until the pH is 4. At first the precipitated compound is somewhat resinous; it hardens on standing in an ice bath, however, into a granular product which, on recrystallising from dilute alcohol or benzene, is obtained as a white crystal powder which melts, with previous softening, at 165°.

*Example 17*

A solution of 5.5 g. of anthranilic acid in 2 N sodium hydroxide solution, the pH of which has been adjusted to 8, is added dropwise while stirring to a solution of 9 g. of 2-phenyl-4,6-dichloropyrimidine in 200 ml. of methyl Cellosolve heated to 75°. After the addition has been completed, the reaction mixture is stirred for a further few hours while being lightly refluxed until the condensation is finished. Then, while still warm, 100 ml. of water containing 5 ml. of glacial acetic acid is carefully added, whereupon the desired N-(2-phenyl-6-chloro-4-pyrimidinyl)-anthranilic acid begins to precipitate in crystalline form. After cooling to room temperature, the compound is filtered off under suction, washed with water and with methanol and can, if necessary, be purified by dissolving in about a 70-fold amount of alcohol at 60°, intermediate filtering of the solution with active charcoal and inducing crystallisation by the addition of a few ml. of water. It is a white, microcrystalline substance having a melting point of 225° (with decomposition).

*Example 18*

5.7 g. of N-(2,6-dichloro-4-pyrimidinyl)-anthranilic acid (Example 5) and 3.8 g. of aniline+60 ml. of absolute ethanol are heated at 100° for 8 hours in a bomb tube. After cooling to room temperature, the slurry-like, almost white precipitate is filtered off under suction and washed with methanol, water and methanol. To purify further, the resulting N-(2-anilino-6-chloro-4-pyrimidinyl)-athranilic acid can be dissolved at room temperature in about 50 ml. of methanol and 15 ml. of 2 N sodium hydroxide solution and, after clarification of the solution with active charcoal, obtained from the solution heated to 50°, in good yield as a finely crystalline substance having a M.P. of 236° (with decomposition), by stirring in 50% acetic acid until the pH is 4.5.

*Example 19*

5.7 g. of N-(2,6-dichloro-4-pyrimidinyl)-anthranilic acid (Example 5) are heated at 110° for 15 hours with 1.8 g. of ethylamine and 40 ml. of absolute ethanol in an autoclave made of glass. After cooling, the resulting N-(2-ethylamino-6-chloro-4-pyrimidinyl)-anthranilic acid is processed and purified in a manner completely analogous to that described in Example 8. The substance is a microcrystalline, almost colourless powder having a M.P. of 217° (with decomposition).

*Example 20*

2.85 g. of N-(2,6-dichloro-4-pyrimidinyl)-anthranilic acid (Example 5) are heated at 100° for 15 hours in a bomb tube with 1.8 g. of n-propylamine and 20 ml. of absolute ethanol. After cooling to room temperature, the reaction mixture is adjusted to a pH of 4.5 with acetic acid and the resulting N-(2-n-propylamino-6-chloro-4-pyrimidinyl)-anthranilic acid is filtered off under suction and washed with methanol, water and methanol. To purify further, the substance can be dissolved in form of the sodium salt and reprecipitated in form of the free acid as described in Example 8, or purified as follows by recrystallising from dimethyl formamide: The compound is dissolved at 40° in about 20 parts of dimethyl formamide and precipitated in the form of fine crystals from the solution treated with active charcoal by the addition of 30 parts of methanol at 40°. It is filtered off under suction, after cooling in an ice bath, and washed with methanol. The M.P. is 228° (with decomposition).

What is claimed is:
1. N-(2,6-dichloro-4-pyrimidinyl)-anthranilic acid.
2. N - (2-n-butoxy-6-chloro-4-pyrimidinyl)-anthranilic acid.
3. N-(2 - methylamino - 6 - chloro - 4 - pyrimidinyl)-anthranilic acid.
4. N - (2 - phenyl-6-chloro-4-pyrimidinyl)-anthranilic acid.
5. N - (2 - anilino-6-chloro-4-pyrimidinyl)-anthranilic acid.

References Cited

FOREIGN PATENTS 971,307   9/1964   Great Britain.

OTHER REFERENCES

Banks: Jour. Amer. Chem. Soc., vol. 66 (1944) p. 1131.

Besley et al.: Jour. Chem. Soc. (London) (1957) pp. 4997–5001.

NICHOLAS S. RIZZO, *Primary Examiner.*

ALEX MAZEL, *Examiner.*

M. U. O'BRIEN, R. J. GALLAGHER,
*Assistant Examiner.*